(12) United States Patent
Huang et al.

(10) Patent No.: US 7,898,634 B2
(45) Date of Patent: Mar. 1, 2011

(54) DISPLAY PANEL WITH PHOTO-CURABLE SEALANT AND MANUFACTURE METHOD THEREOF

(75) Inventors: Mei-Lien Huang, Hsin-Chu (TW);
Shih-Yu Wang, Hsin-Chu (TW);
Chung-Wei Liu, Hsin-Chu (TW);
Yung-Sheng Chiu, Hsin-Chu (TW)

(73) Assignee: Au Optronics Corporation, Hsin-Chu (TW)

(*) Notice: Subject to any disclaimer, the term of this patent is extended or adjusted under 35 U.S.C. 154(b) by 389 days.

(21) Appl. No.: 12/136,324

(22) Filed: Jun. 10, 2008

(65) Prior Publication Data
US 2008/0309866 A1 Dec. 18, 2008

(30) Foreign Application Priority Data
Jun. 12, 2007 (TW) .............................. 96121236 A

(51) Int. Cl.
*G02F 1/1339* (2006.01)
(52) U.S. Cl. ....................................... 349/153; 349/190
(58) Field of Classification Search ................. 349/153, 349/190; 445/25
See application file for complete search history.

(56) References Cited

U.S. PATENT DOCUMENTS

| | | | |
|---|---|---|---|
| 5,757,450 A | 5/1998 | Fujii et al. | |
| 5,889,569 A | 3/1999 | Okamoto et al. | |
| 6,400,439 B1* | 6/2002 | Fujioka et al. | 349/153 |
| 6,577,367 B2 | 6/2003 | Kim | |
| 6,646,709 B2* | 11/2003 | Matsumoto | 349/156 |
| 6,862,069 B2 | 3/2005 | Kwak et al. | |
| 6,954,242 B2 | 10/2005 | Youn et al. | |
| 7,130,006 B2 | 10/2006 | Chu et al. | |
| 7,230,669 B1* | 6/2007 | Tashiro et al. | 349/153 |
| 2005/0030468 A1 | 2/2005 | Jung et al. | |
| 2007/0091246 A1* | 4/2007 | Sugimoto | 349/153 |

(Continued)

FOREIGN PATENT DOCUMENTS

CN 1673822 9/2005

(Continued)

OTHER PUBLICATIONS

Chinese language office action dated Oct. 10, 2008.

(Continued)

*Primary Examiner*—Hoan C Nguyen
(74) *Attorney, Agent, or Firm*—Thomas, Kayden, Horstemeyer & Risley, LLP

(57) ABSTRACT

A display panel and a manufacture method thereof are provided. The display panel includes a first substrate, a second substrate, and a sealant. The first substrate has a top surface which includes a signal transmission module parallel to an edge of the top surface. The sealant is disposed on the top surface and parallel to the signal transmission module, which is disposed between the top surface and sealant. The sealant is made of a photo-curable material and includes an inner isolation wall, which is exposed via the signal transmission module. The second substrate is disposed on the sealant and includes an inner surface. A light-shielding structure is disposed on the inner surface and close to an edge of the inner surface. The sealant at least partially overlaps the light-shielding structure.

26 Claims, 16 Drawing Sheets

U.S. PATENT DOCUMENTS

2007/0296906 A1* 12/2007 Eun et al. .................. 349/153

FOREIGN PATENT DOCUMENTS

| | | |
|---|---|---|
| CN | 1683963 | 10/2005 |
| JP | 2004-333806 | 11/2004 |

OTHER PUBLICATIONS

English language translation of abstract and pertinent parts of CN 1683963.

English language translation of abstract and pertinent parts of CN 1673822.

English language translation of abstract and pertinent parts of JP 2004-333806.

* cited by examiner

DISPLAY PANEL WITH PHOTO-CURABLE SEALANT AND MANUFACTURE METHOD THEREOF

BACKGROUND OF THE INVENTION

1. Field of the Invention

The present invention relates generally to a display panel and a manufacture method thereof and, more particularly, to a liquid crystal display panel with one drop fill (ODF) technique and manufacture thereof.

2. Description of the Prior Art

As the display panel industry is prospering, display panels have been applied to various electronic devices. Especially, the liquid crystal display panel incorporating well-established technique is applied to a variety of electronic display devices such as televisions, monitors, mobile communication devices, laptops, etc.

Recently, the designers of electronic devices strive to reduce the sizes of electronic devices in order to meet consumers' demand. However, under the pressure of minimizing the device size, the display area of display panel is expected to increase as well. In addition, the improvement in image processing technique and the increase in image resolution require the corresponding increase in the viewing area of display panel. Thus, it has been an important issue on how to maximize the display area while maintaining the size of the display panel.

In the diagram of conventional liquid crystal display panel shown in FIG. 1, the conventional liquid crystal display panel includes thin film transistor substrate (TFT substrate) 10, display substrate 20 and sealant 30. Sealant 30 is disposed between TFT substrate 10 and display substrate 20 near the edges of both substrates. Liquid crystal material 70 is infused into the space between the TFT substrate 10 and display substrate 20, wherein the sealant 30 restrains the liquid crystal material 70 from leaving the space between the TFT substrate 10 and the display substrate 20. The signal transmission circuit 50 is disposed on the TFT substrate 10 and under the sealant 30. Generally, the signal transmission circuit 50 has large area of circuit elements or metal conductive pads, which makes it difficult for light to penetrate through the signal transmission circuit 50. The location near the sealant 30 on display substrate 20 is disposed with black matrix 23. The black matrix 23 is connected with the color filter layer 25 on the display substrate 20 in order to minimize the light leaking effect around the display substrate 20.

Furthermore, in the manufacture process of display panel, one drop fill technique uses photo-curable material as the material of sealant 30. In the above-mentioned manufacture process, after TFT substrate 10 and display substrate 20 are connected with sealant 30, the sealant 30 is shined with ultraviolet light to solidify in order to increase the coupling between the TFT substrate 10 and display substrate 20. Because the signal transmission circuit 50 is not easy to be penetrated by light beam, ultraviolet light is usually emitted through display substrate 20 to make the sealant 30 curing.

SUMMARY OF THE INVENTION

It is an object of the present invention to provide a display panel and a manufacture method thereof having a larger display area of.

It is another object of the present invention to provide a display panel and a manufacture method thereof with little contaminating opportunity of liquid crystal material.

It is another object of the present invention to provide a display panel and a manufacture method thereof with preferred high product yield rate.

The present invention of the display panel includes a first substrate, a second substrate and sealant. The first substrate has a top surface. A signal transmission module is disposed on the top surface and is parallel to an edge of the top surface of the first substrate. The sealant is disposed on the top surface of the first substrate and substantially parallel to the signal transmission module; thus, the signal transmission module is disposed between the sealant and the top surface of the first substrate.

The sealant has an inner isolation wall. The inner isolation wall is disposed between the sealant and the display area of the display device. The composition of the sealant includes a photo-curable material. From the viewpoint through the first substrate to observe the sealant, the signal transmission module partially covers the sealant. When ultraviolet light passes the first substrate and reach the sealant, the signal transmission module only partially covers the sealant. At the moment, the other uncovered part of sealant is exposed under ultraviolet light to generate photo-curing reaction.

The second substrate is disposed on the sealant to position the sealant between the first substrate and the second substrate. The second substrate has an inner surface. A light-shielding structure is disposed on the inner surface close to an edge of the inner surface. At such condition, the light-shielding structure is substantially parallel to an edge of the inner surface. The light-shielding structure is disposed between the second substrate and the sealant. The sealant at least partially overlaps the light-shielding structure.

The present invention of a method for manufacturing the display panel, the method includes: providing the first substrate and disposing a signal transmission module substantially parallel to an edge of a top surface on the top surface of a first substrate; disposing a sealant on the top surface of the first substrate, wherein the sealant includes a photo-curable material and an inner isolation wall. In addition, disposing a sealant parallel to the signal transmission module to make signal transmission module partially cover the sealant. This step also exposes the inner isolation wall to form a light-irradiating area.

Consequently, disposing liquid crystal material into the area sealed by the sealant furthermore, covering the inner surface of the second substrate on the sealant and the liquid crystal material; positioning the light-shielding structure close and parallel to an edge of the inner surface to make sealant at least partially overlap the light-shielding structure; finally, irradiating a the light through the first substrate and signal transmission module toward the sealant to make photo-curing of the inner isolation wall of the light-irradiating area and the uncovered area.

DETAILED DESCRIPTION OF THE PREFERRED EMBODIMENT

The present invention provides a display panel and a method for manufacturing thereof. In preferred embodiment of the present invention, the display panel and the method for manufacturing thereof is using one drop fill (ODF) process. However, in other embodiments, the present invention may also uses infusing liquid crystal process or other processes. Besides, the display panel of the present invention includes polycrystalline silicon thin film transistor(TFT) panels (ex. Low-temperature or high-temperature), amorphous Si TFT panel, monocrystalline silicon TFT panel, microcrystalline silicon TFT panel, germanium compound-based TFT panel or other types of liquid crystal panels.

Figure 1:
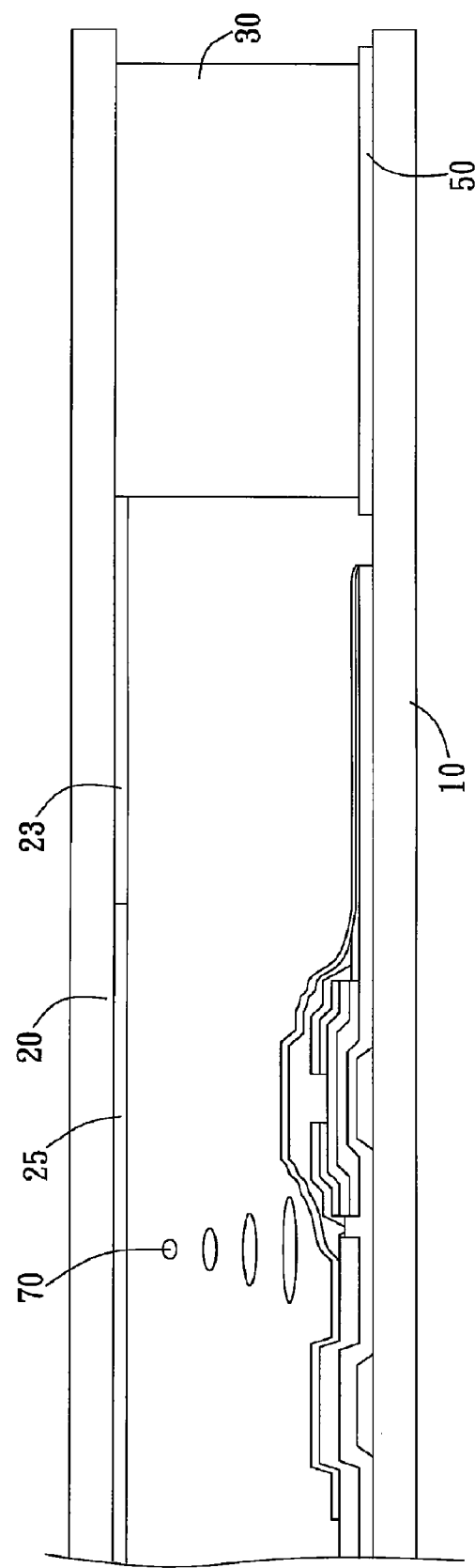
FIG. 1 shows a traditional liquid crystal display panel.
Figure 2:
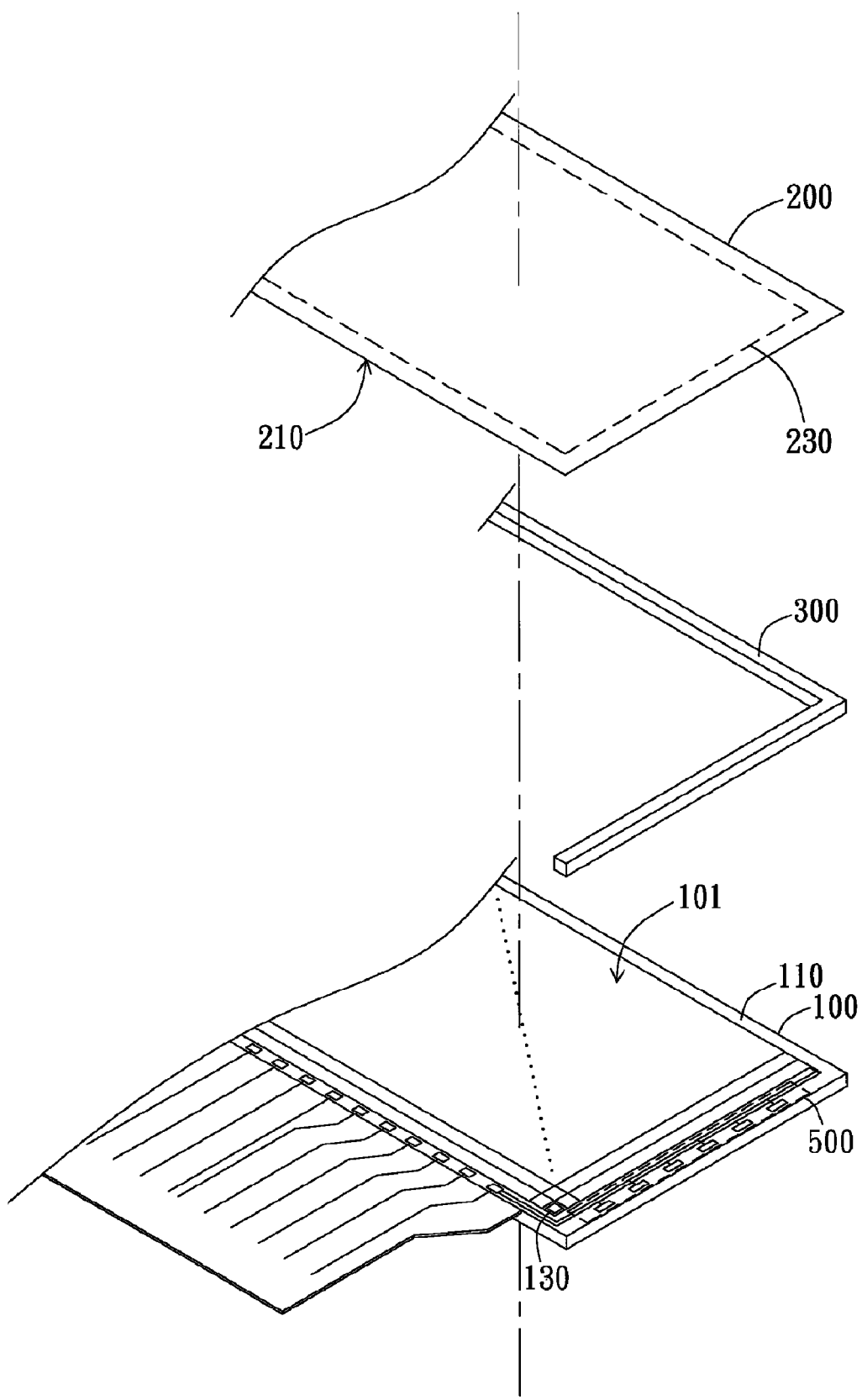
FIG. 2 illustrates an explosive view of a first embodiment of display panel.

In the first embodiment of the present invention shown in FIG. 2, the display panel includes a first substrate 100, a second substrate 200, and a sealant 300. The first substrate preferably includes a circuit substrate; the TFT or other circuit components 130 are disposed on the display area 101 of the circuit substrate. The TFT includes bottom-gate types (ex. Etch-stop type, back-channel etch (BCE) type, single gate type, double gates type, triple gates type, or other types), top-gate type (ex. single gate type, double gates type, triple gates type, or other types), or other types. With reference to FIG. 2, the first substrate 100 has a top surface 110. A signal transmission module 500 is disposed on the top surface 100 and substantially parallel to an edge of the top surface 100 on the first substrate 100. The preferred signal transmission module 500 includes opaque metal conductive lines for transmitting outer signals to the circuit component 130 of the first substrate 100. The preferred signal transmission module 500 also includes the combination of opaque metal conductive lines and transparent metal conductive lines. The material of opaque metal conductive lines includes gold, silver, copper, iron, stannum, lead, cadmium, molybdenum, rubidium, wolfram, nickel, aluminum, titanium, tantalum, other metal, alloy of the metals described above, nitrides of the metals described above, oxides of the metals described above, nitrogen oxide of metal described above, or combinations thereof. The material of the transparent metal conductive lines includes ITO, ZnO, AlO, CdO, SnO, IZO, other material, or combinations thereof. Because the preferred signal transmission module 500 is actually parallel to the edge, the signal transmission module 500 transmits signals through at least one of any edges (such as terminated portion) of the first substrate 100 and the circuit component 130 of display area 101.

With reference to FIG. 2, the sealant 300 is disposed on the top surface 110 of the first substrate 100 and substantially parallel to the signal transmission module 500. In other words, the sealant 300 is actually parallel to the edge of the first substrate 100. The signal transmission module 500 is disposed between the sealant 300 and the top surface 110 of the first substrate 100. Through the viewpoint from the first substrate 100 to the sealant 300, the signal transmission module 500 partially covers the sealant 300. When light passes through the first substrate 100 to reach the sealant 300, the signal transmission module 500 only partially covers the sealant 300. Thus, at the moment, the other uncovered part of sealant 300 is exposed under the light. This phenomenon generates the photo-curing reaction.

Figure 3:
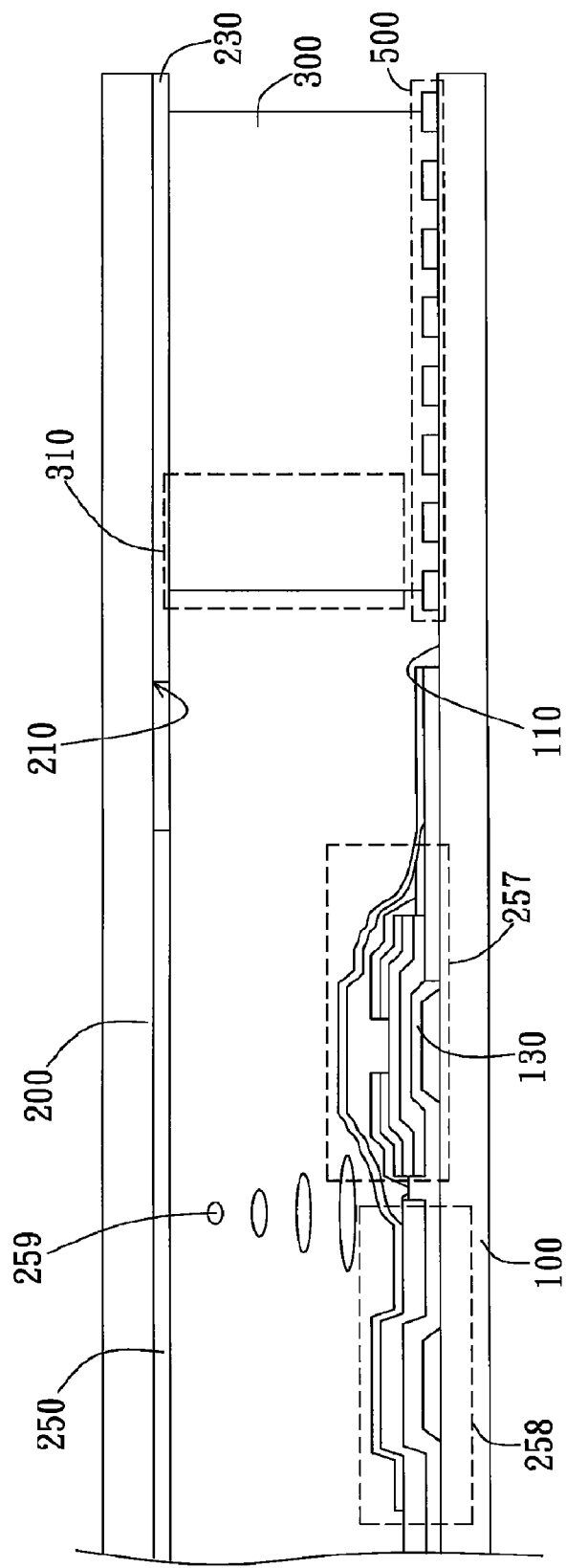
FIG. 3 shows a side view of the first embodiment.

As the side view of the FIG. 3 shows, the sealant 300 has an inner isolation wall 310. The inner isolation wall 310 is the photo-cured portion of the sealant 300 and is connected with the display area. In other words, the preferred inner isolation wall 310 is a part of the sealant 300. The preferred display area near the inner isolation wall 310 includes a thin film transistor 257, a storage capacitor 258, a liquid crystal 259, or/and other circuit components. The preferred thin film transistor 257 includes a gate electrode, source electrode, drain electrode, semi-conductive layer, insulating layer, passivation layer and/or other layers; however, these components can be adjusted depending on the circuit design and/or types of thin film transistor. Considering several factors including the strength of the structure, the efficacy of isolation and the decrease of total device volume, the thickness of inner isolation wall 310 is preferably between about 150 μm and about 200 μm. The signal transmission module 500 on the first substrate 100 exposes the inner isolation wall 310 of the sealant 300 to form a light-irradiating area. In other words, when the light passes through the first substrate 100 to reach the sealant 300, the inner isolation wall 310 of the light-irradiating area is not covered by the signal transmission module 500. Thus, the uncovered sealant is exposed under the light to generate photo-curing reaction.

The material of the sealant 300 includes photo-curable material. This photo-curable material includes invisible light photo-curable material (ex. ultraviolet light, infrared light, other types of light, or combinations thereof), visible photo-curing material, or combinations thereof. In the embodiment, the photo-curable material may includes acryl compound ((ex. acryl resin), polyesters, polyuridylic compounds, polyurethane, polyether, other compounds as well as derivatives, or combinations thereof). In addition, the material of the sealant includes thermo-curable material (ex. epoxy resin, polyethylene compound, melamine compound, xylene compound, polyphenol compound, polyol-compound, polyethylene acid compound, other compounds, or combinations thereof. However, in the embodiment, the percentage of the photo-curable material in the total material is preferably greater than about 75%, but not limited thereto. Furthermore, in order to assist the polymerization of the photo-curable material and/or thermo-curing, the curable material includes at least one of initiative agent, hardening agent, coupling agent, and other additives, but does not limit to certain agents.

With reference to FIG. 2 and FIG. 3, the second substrate 200 is disposed on the sealant 300 to make the sealant 300 be disposed between the second substrate 200 and the first substrate 100. The second substrate 200 is preferably a display substrate having an inner surface 210. A light-shielding structure 230 is disposed on the inner surface. The light-shielding structure 230 is close and substantially parallel to an edge of the inner surface. The light-shielding structure 230 preferably includes a black matrix. The light-shielding structure 230 is disposed between the sealant 300 and the second substrate 200. In the present embodiment, the sealant 300 totally overlaps the light-shielding structure 230. However, in another embodiment, the sealant 300 may only partially overlap the light-shielding structure 230. Therefore, when light passes through the second substrate 200 to reach the sealant 300, the light-shielding structure 230 will partially or totally cover the sealant 300 from light. Besides, in the present embodiment, the color filter layer 250 is disposed on the inner surface 210 of the second substrate 200 to make the image colorful when the image passes the second substrate 200. However, in another embodiment, the color filter layer 250 may be disposed on the circuit substrate (ex. color filter on array or array on color filter) instead of being disposed on the second substrate 200.

Figure 4:
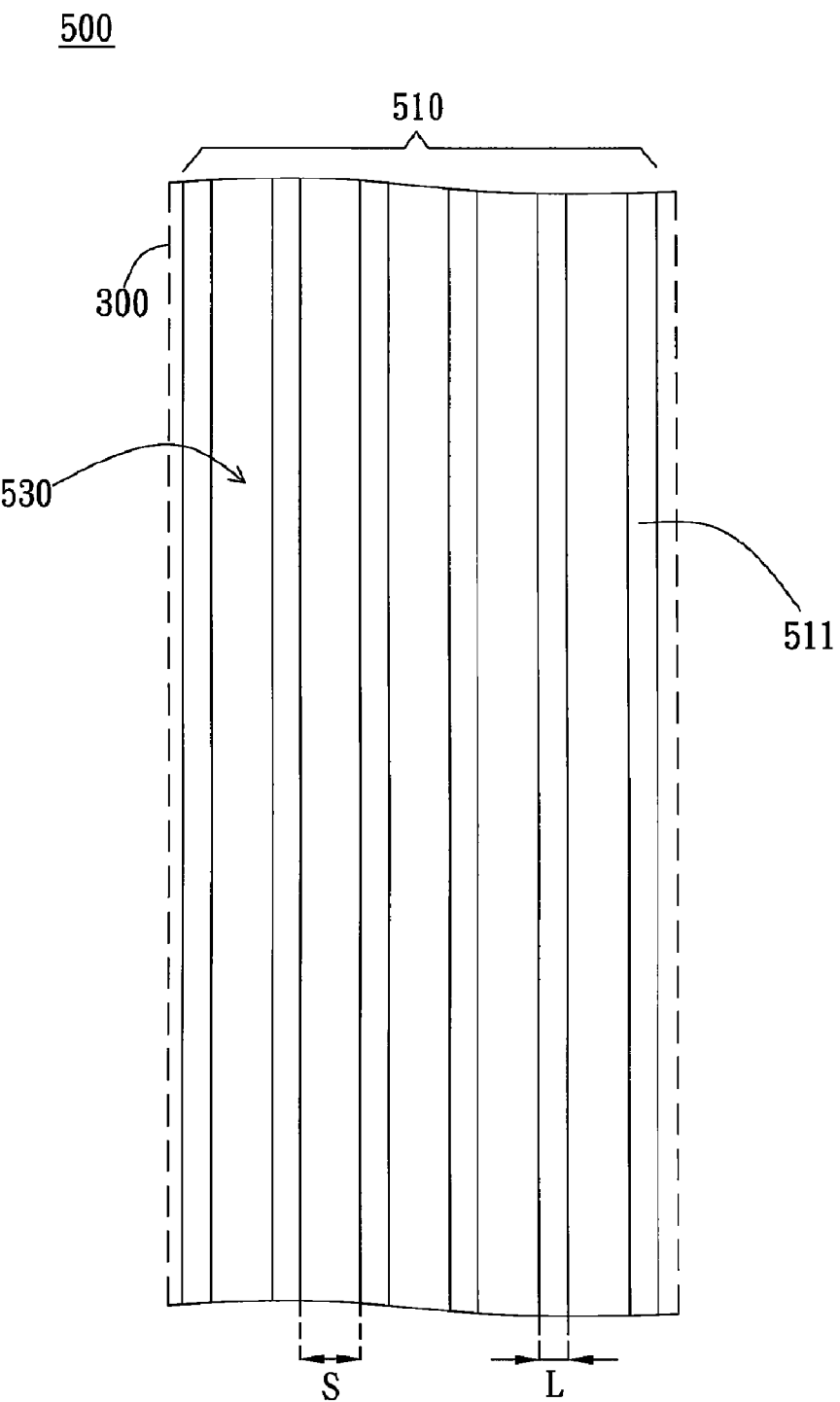
FIG. 4 illustrates the signal transmission module of the first embodiment.
Figure 5A:
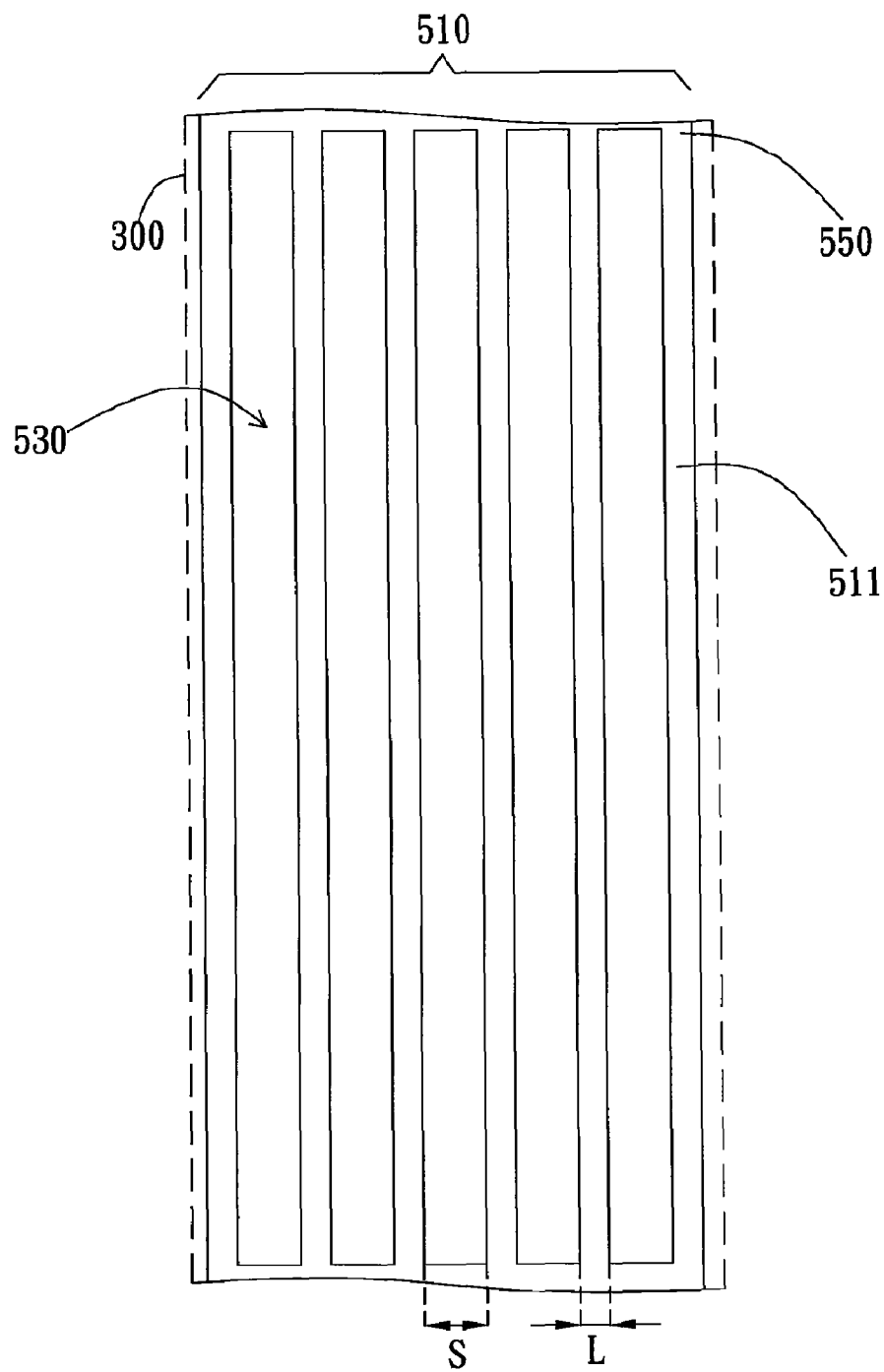
FIG. 5a illustrates the signal transmission module of an alternative of the first embodiment.
Figure 5B:
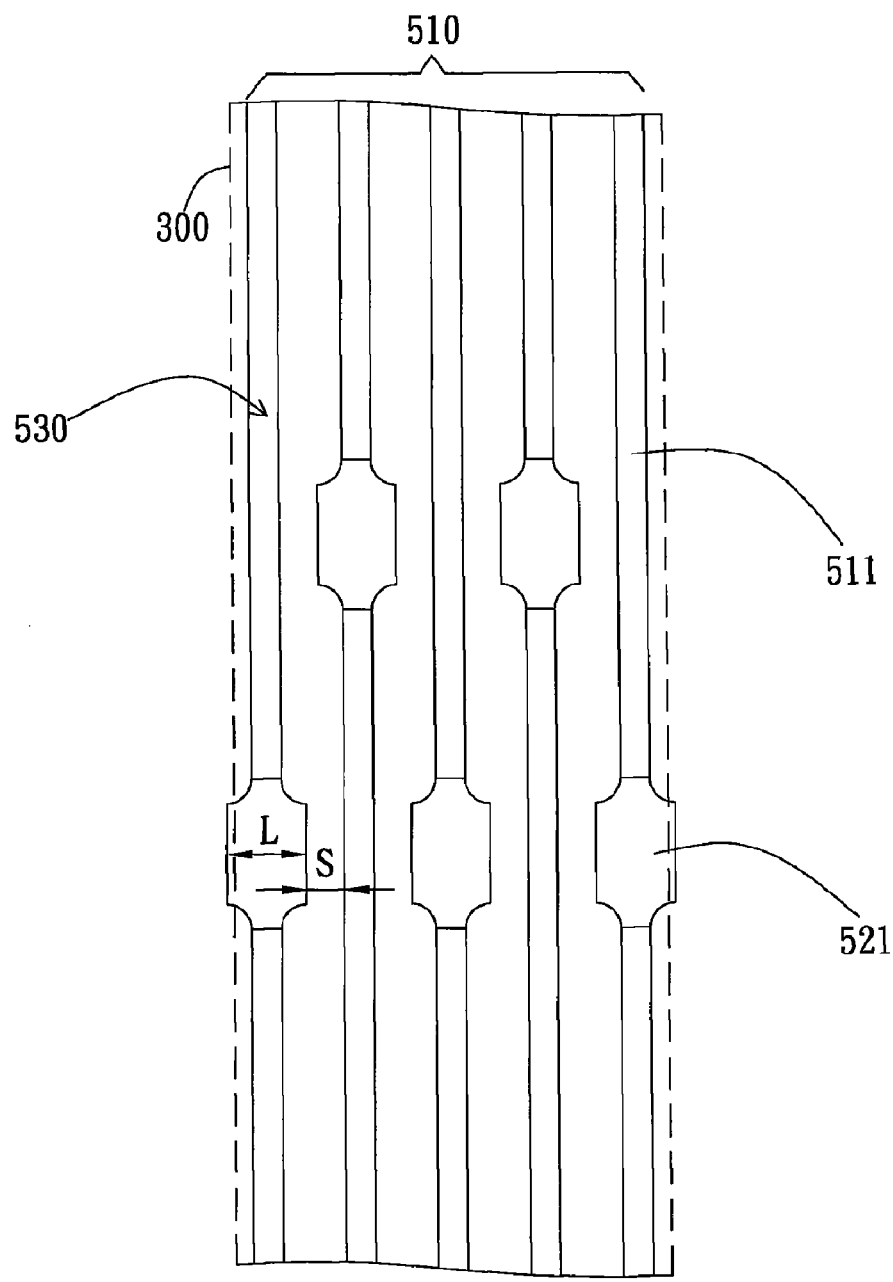
FIG. 5b illustrates the signal transmission module of an alternative of the first embodiment.

In the first embodiment of signal transmission module 500 shown in FIG. 3 and FIG. 4, the signal transmission module 500 includes a shading area 510 and plural transparent gaps 530 formed in the shading area 510. The light-irradiating area on the sealant 300 can be generated by forming the transparent gaps 530. The light entering from the first substrate 100 partially passes through the signal transmission module 500 to reach the sealant 300 behind the signal transmission module 500. In the first embodiment, the shading area 510 has plural conductive lines 511. The plural conductive lines 511 are substantially parallel to each other. The transparent gaps 530 are substantially parallel to each other and are formed between each of the conductive lines 511. The preferred conductive lines 511 extend along the sealant 300 and are independent to each other. However, in another embodiment shown in FIG. 5a, the shading area 510 can be a slice-shaped conductive pad 550 where the plural parallel transparent gaps 530 are formed while a plurality of parallel conductive lines 511 are formed between the transparent gaps 530. In this embodiment, the plural conductive lines 511 all transmit the same signal. Besides, in the alternative embodiment shown in FIG. 5b, the parallel conductive lines 511 can also form the connected pad 521 or have other different shapes.

Figure 6:
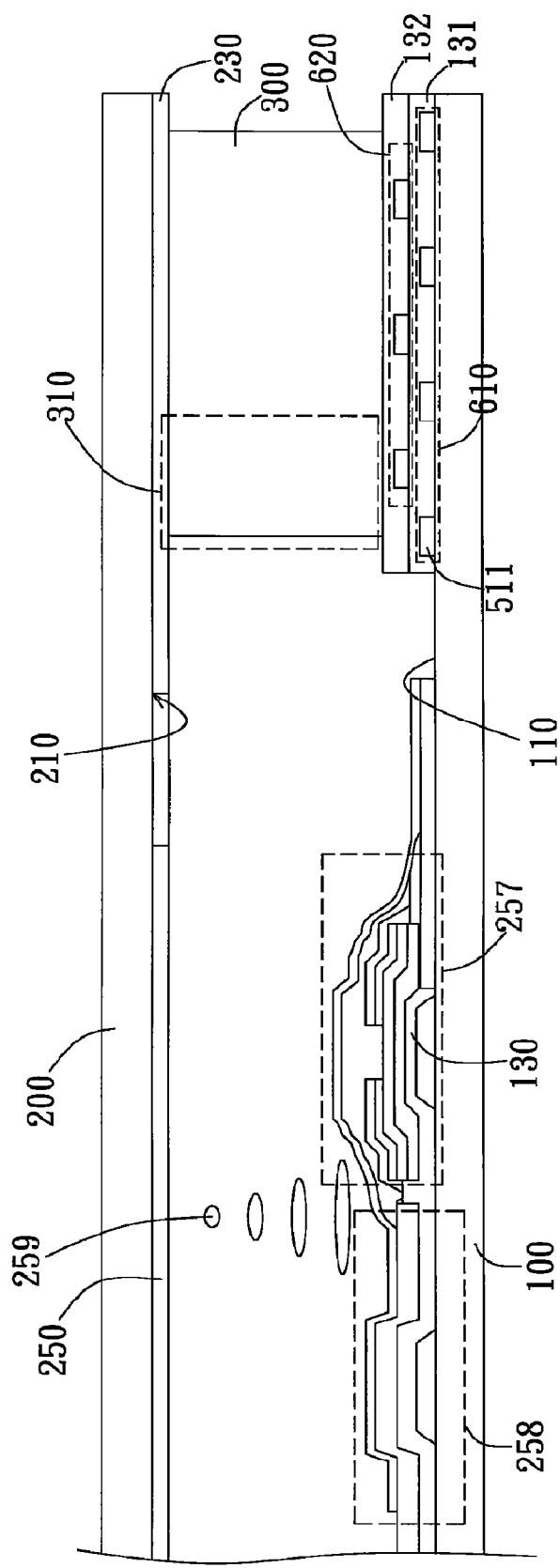
FIG. 6 illustrates the side view diagram of the alternative of the first embodiment.

In another alternative embodiment of the first embodiment shown in FIG. 6, plural conductive lines 511 can be divided into a first group 610 and a second group 620. The first group of the conductive lines 511 has a first distance relative to the sealant 300 in the vertical direction while the second group 620 of the conductive lines 511 has a second distance relative to the sealant 300 in the vertical direction, wherein the first distance is substantially greater than the second distance. In other words, the distance relative to the sealant 300 in the vertical direction represents the distance between the bottom surface of the sealant and the top surface of the first group 610/second group 620 of the conductive lines 511. Particularly, in the embodiment, the first substrate 100 includes a first circuit layer 131 and the second circuit layer 132. The first circuit layer 131 and the second circuit layer 132 are overlapped and are disposed on the top surface 110 of the first substrate 100. The conductive lines 511 of the first group 610 are formed in the first circuit layer 131 while the conductive lines 511 of the second group are formed in the second circuit layer 132. In addition, the conductive lines 511 of the first group 610 and the conductive lines 511 of the second group 620 are staggered arrangement. In other words, one of the conductive lines 511 of the second group 620 is disposed between two adjacent conductive lines 511 of the first group 610.

Figure 7A:
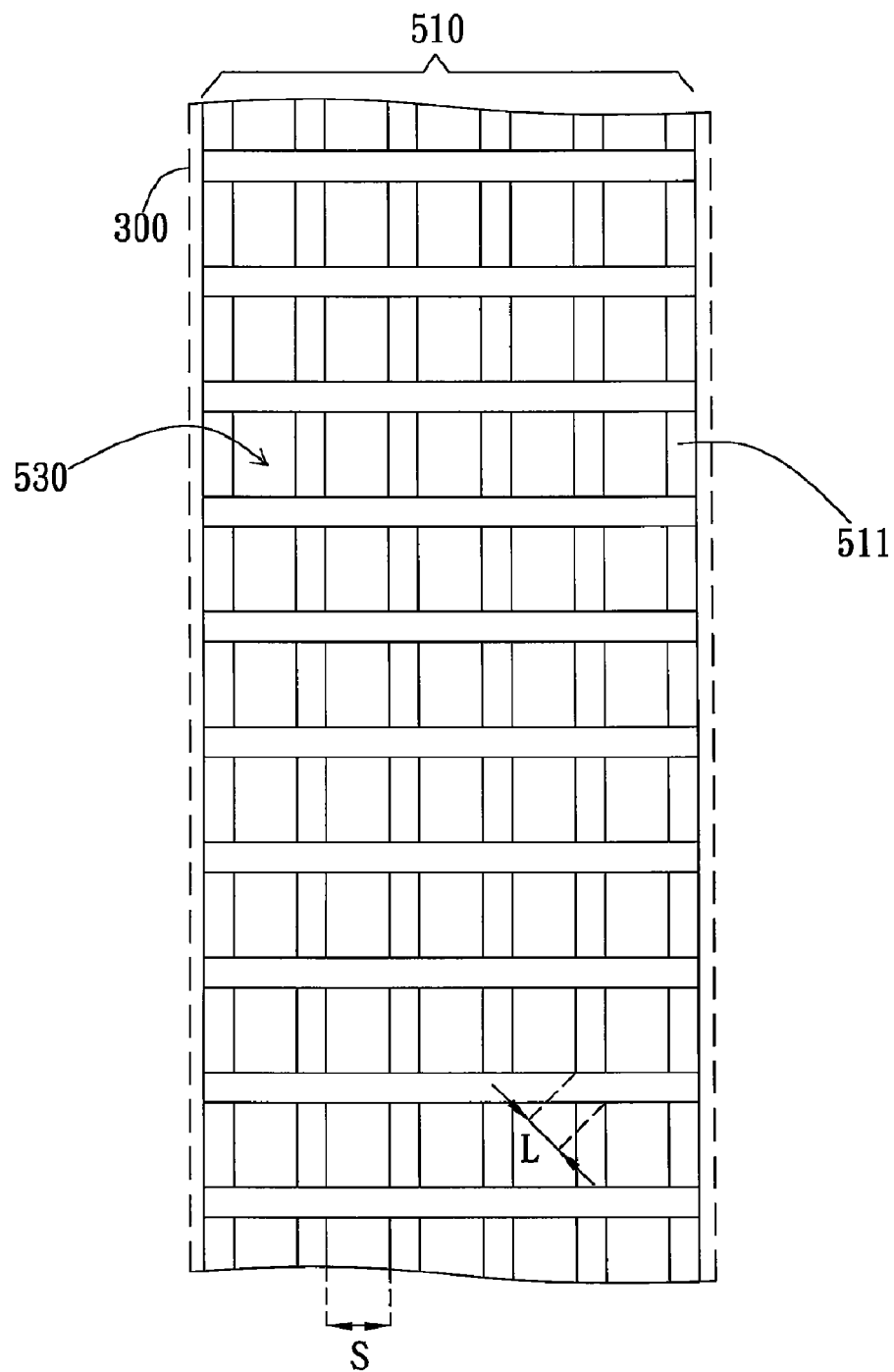
FIG. 7a illustrates a second embodiment of the display device.
Figure 7B:
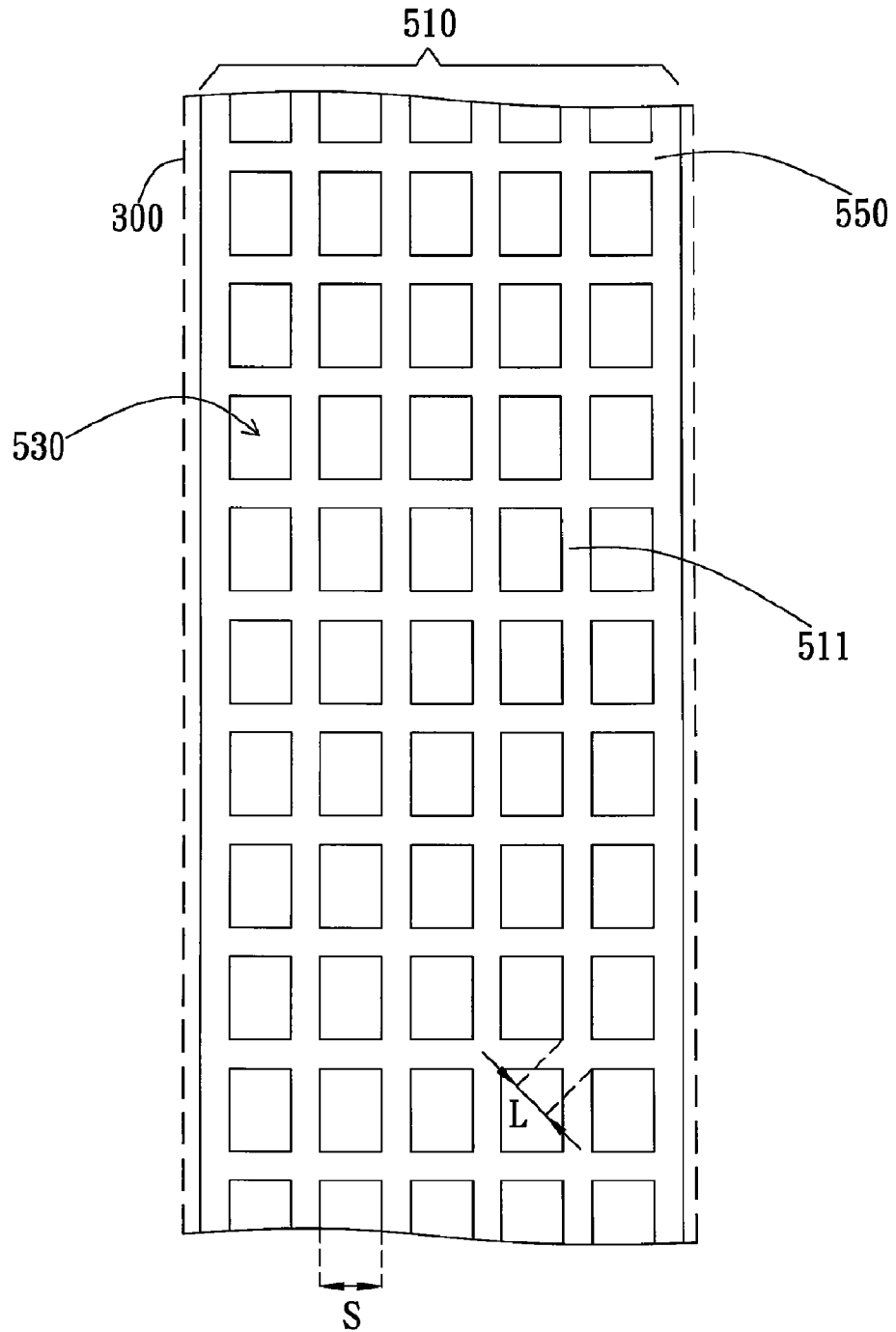
FIG. 7b illustrates an alternative of the second embodiment.
Figure 7C:
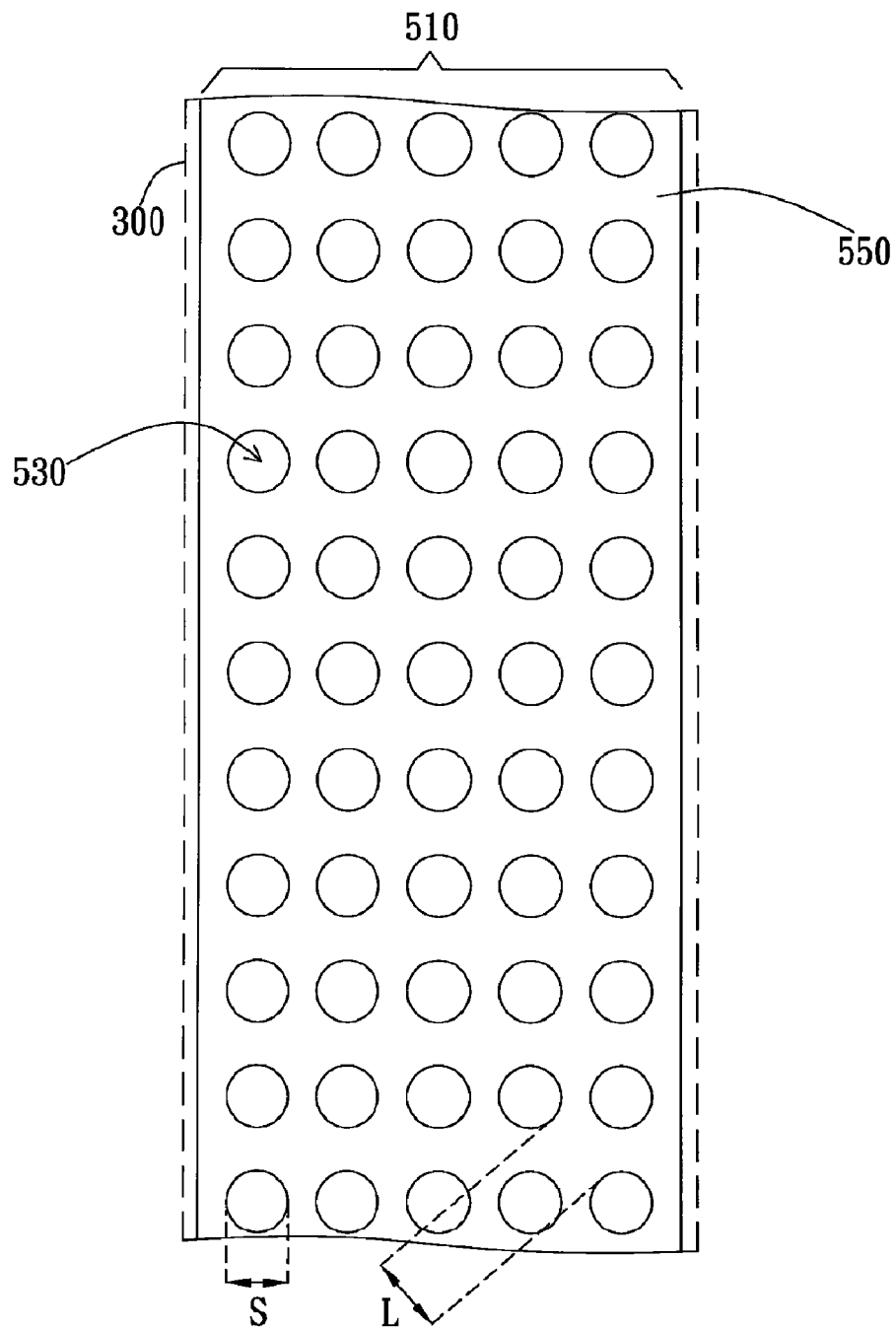
FIG. 7c illustrates an alternative of the second embodiment.

In the second embodiment shown in FIG. 7a, the shading area 510 includes plural conductive lines 511. The conductive lines 511 interlace with each other to form a grid-like conductive pad. A plurality of holes is formed in the grid-like conductive pad among the conductive lines 511. These holes form the transparent gaps 530. The plural conductive lines 511 preferably interlace to form the grid-like conductive pad. However, in another embodiment shown in FIG. 7b, the shading area 510 also has a slice-shaped conductive pad 550 to form plural matrix-distributed rectangular transparent gaps 530 on the slice-shaped conductive pad 550 further to form the conductive lines 511 and the grid-like conductive pad. In this embodiment, the plural conductive lines 511 all transmit the same signals. In the alternative of the second embodiment shown in FIG. 7c, the shading area 510 has a slice-shaped conductive pad 550 and forms plural matrix-distributed circular transparent gaps 530.

In the embodiments shown in FIG. 4, FIG. 5a, FIG. 5b and FIG. 7a to FIG. 7c, L/S may be used as a symbol of the ratio of the width of the shading area 510 to the width of the transparent gaps 530, wherein L is the width of single conductive lines 511, and S is the width of single transparent gaps. However, in the embodiment shown in FIG. 7c, L may be determined according to the maximal width of the node of conductive lines 511. Besides, in the embodiment shown in FIG. 4, FIG. 5a, FIG. 5b and FIG. 7a to FIG. 7c, the width of the sealant 300 is substantially greater than the width of the signal transmission module 500. However, in another embodiment, the width of the sealant 300 may be designed to be substantially less than the width of the signal transmission module 500. Preferably, the width of the sealant 300 is substantially equal to the width of the signal transmission module 500.

Figure 8:
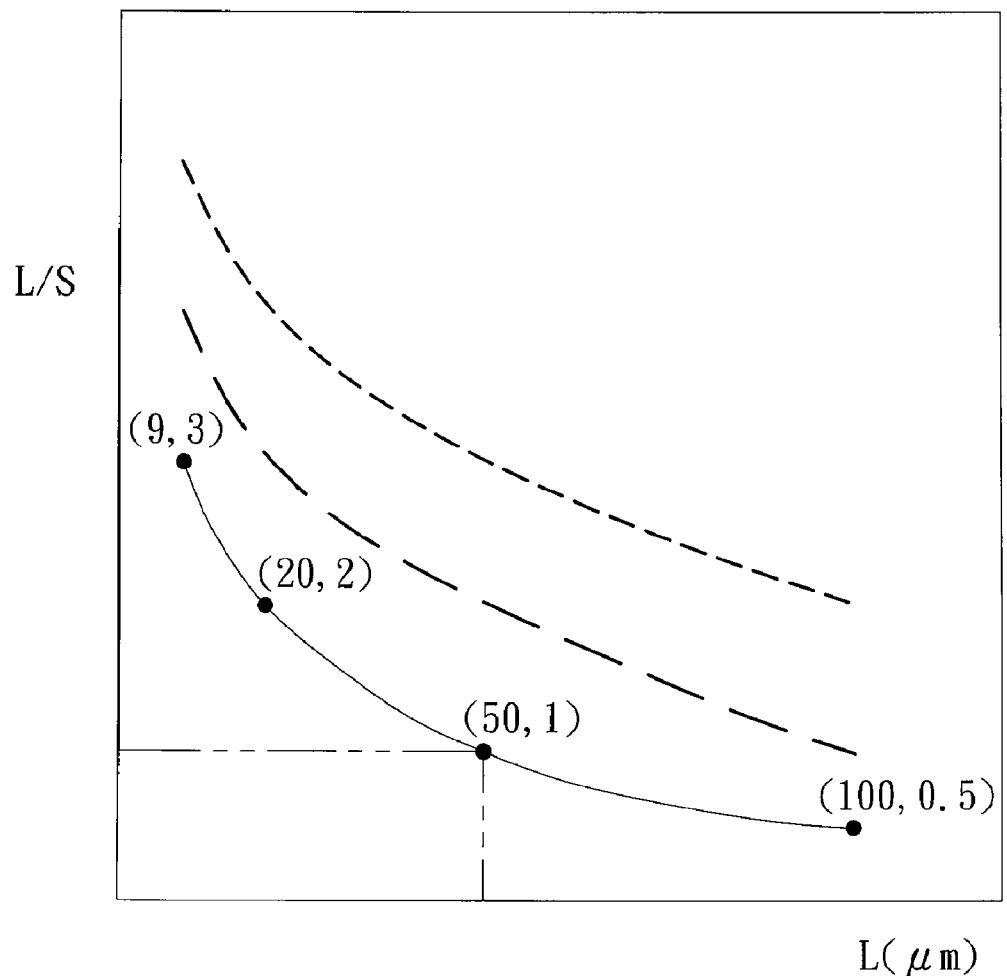
FIG. 8 illustrates the relationship between the L/S ratio and the L width of the single conductive line.

FIG. 8 illustrates a correlation curve between the L/S ratio and the L width of the single conductive lines 511. As FIG. 8 shows, the correlation curve may be linear curves or non-linear curves; however, the width L of one conductive line 511 increases when the L/S ratio decreases. In other words, when the width L of the conductive line 511 increases, the width S of the transparent gaps also increases to enlarge the luminosity through the transparent gaps and the photo-curing area of the sealant 300. In addition, the L/S ratio will increase by following the increasing of the photo-curability of the sealant 300. In other words, if the material of the sealant 300 only needs less luminosity to generate the same photo-curing effect, it means that this material requires less irradiating light. Thus, when we use such material on the same width L of conductive lines 511, it requires less width S of the transparent gaps to make the corresponding L/S ratio larger and shifts the correlation curve to up and right.

Figure 9:
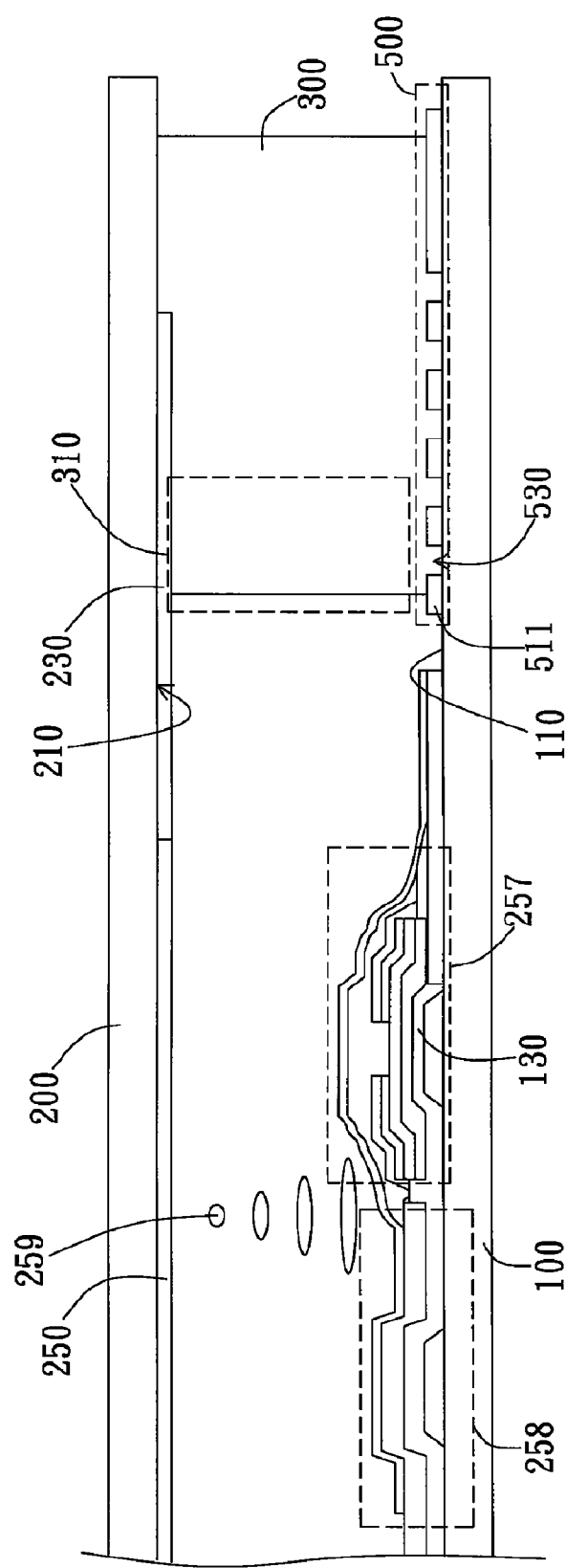
FIG. 9 illustrates a third embodiment of the display device.

In the third embodiment shown in FIG. 9, the sealant 300 partially overlaps the light-shielding structure 230 of the second substrate 200; it means that the light-shielding structure 230 only partially covers one part of the sealant 300. Thus, the overlapping area between the sealant 300 and the light-shielding structure 230 is exposed by the signal transmission module 500 to form a light-irradiating area. Therefore, one part of the sealant 300 can receive the irradiating light through the second substrate 200 to generate photo-curing reaction in such part of the sealant 300 while the other part of the sealant 300 can receive the irradiating light through the first substrate 100 to generate photo-curing reaction in this part of the sealant 300.

Figure 10A:
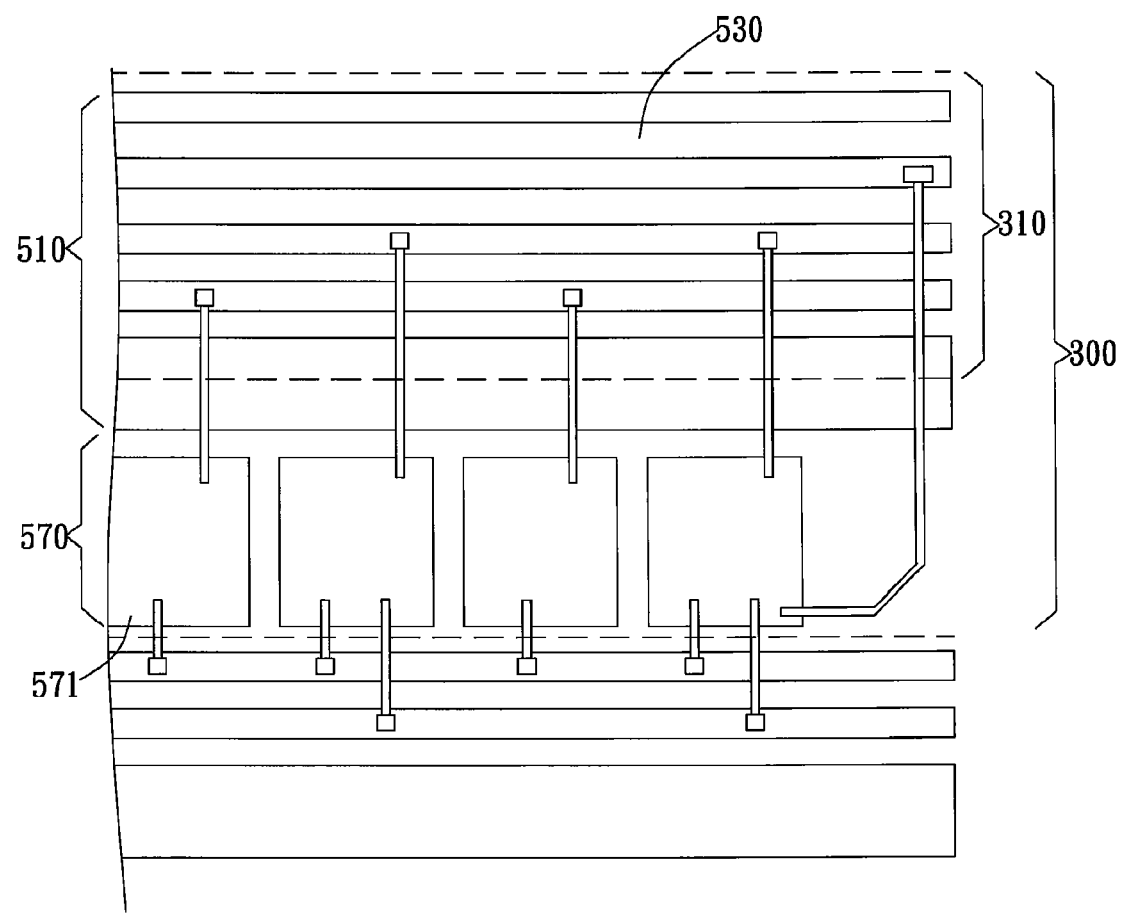
FIG. 10a illustrates a fourth embodiment of display device.

In the fourth embodiment shown in FIG. 10a, the signal transmission module 500 has a dense-shading area 570. The dense-shading area 570 is capable of existing in the signal transmission module 500 alone. With reference to FIG. 10a, the dense-shading area 570 also can exist with the shading area 510 described above in the signal transmission module 500. The dense-shading area 570 preferably includes circuit components such as the shift register 571. Because the transparent gaps cannot be formed on the circuit components, the shading area of the dense-shading area is substantially greater than other parts of the signal transmission module 500. However, in another embodiment, the dense-shading area 570 can be the slice-shaped conductive pad without transparent gaps. The dense-shading area 570 is disposed corresponding to an outer part of the inner isolation wall 310 of the sealant 300. Because the inner isolation wall 310 does not overlap the dense-shading area 570, the inner isolation wall 310 is able to receive enough irradiating light to generate photo-curing reaction. The inner isolation wall 310 can isolate the shading area of the dense-shading area 570 on the sealant 300 in order to prevent the shading area from contaminating the display area due to photo-curing defect. In addition, the signal transmitted by the signal transmission module 500 can be common signal as an example; however, the signal can be other signals such as transmission test signal, turn-on and-off signal, electronic signal, scanning signal, information signal, other signals, or combinations thereof.

Figure 10B:
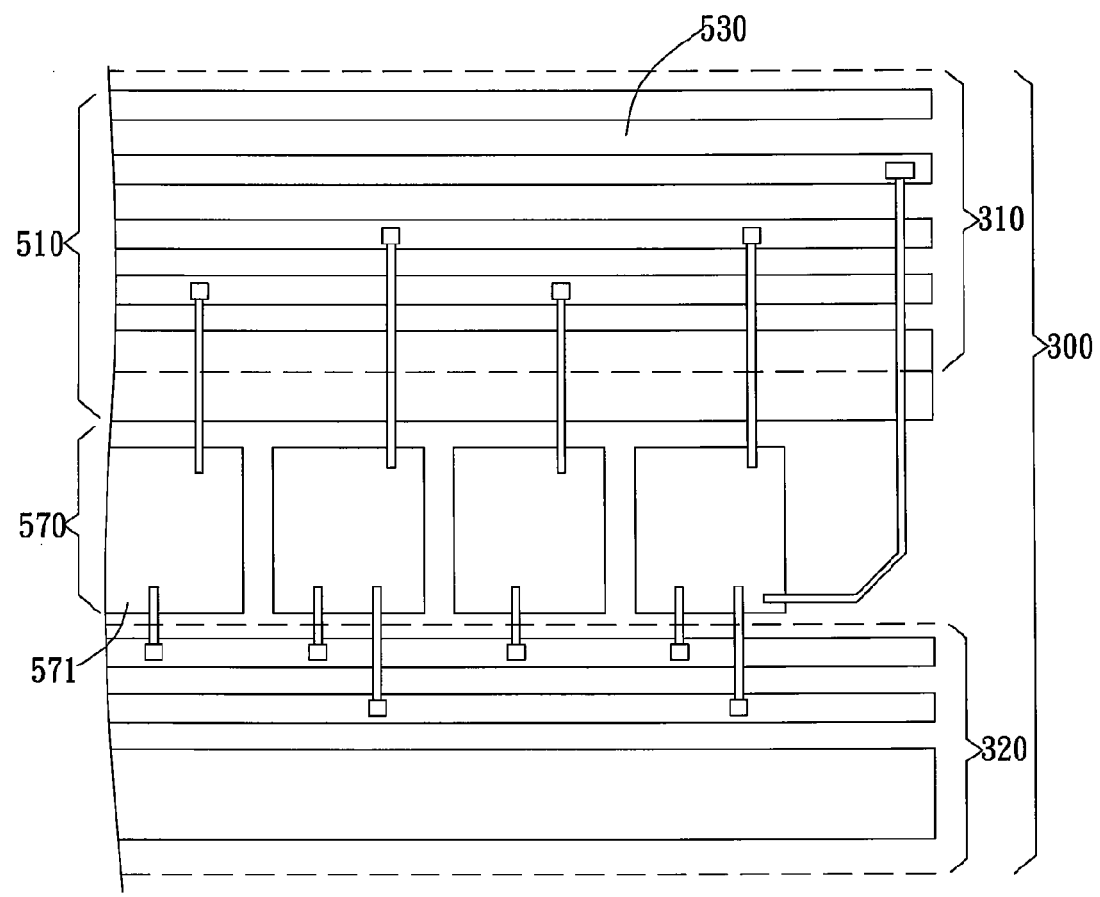
FIG. 10b illustrates an alternative of the fourth embodiment.

In the alternative of the fourth embodiment shown in FIG. 10b, the sealant 300 has an outer isolation wall 320 substantially parallel to the inner isolation wall 310. The outer isolation wall 320 is disposed on the outer part of the sealant 300. Because the outer isolation wall 320 dose not overlap the dense-shading area 570, the outer isolation wall 320 is able to receive enough light to generate photo-curing reaction. The outer isolation wall 320 can isolate the shading area of the dense-shading area 570 on the sealant 300 in order to prevent the shading area from contaminating the outer part of the outer isolation wall 320 due to photo-curing defect. Moreover, the inner isolation wall 310 and the outer isolation wall 320 can provide the binding corresponding to the first substrate 100 and the second substrate 200 to maintain the structure stability.

Figure 11:
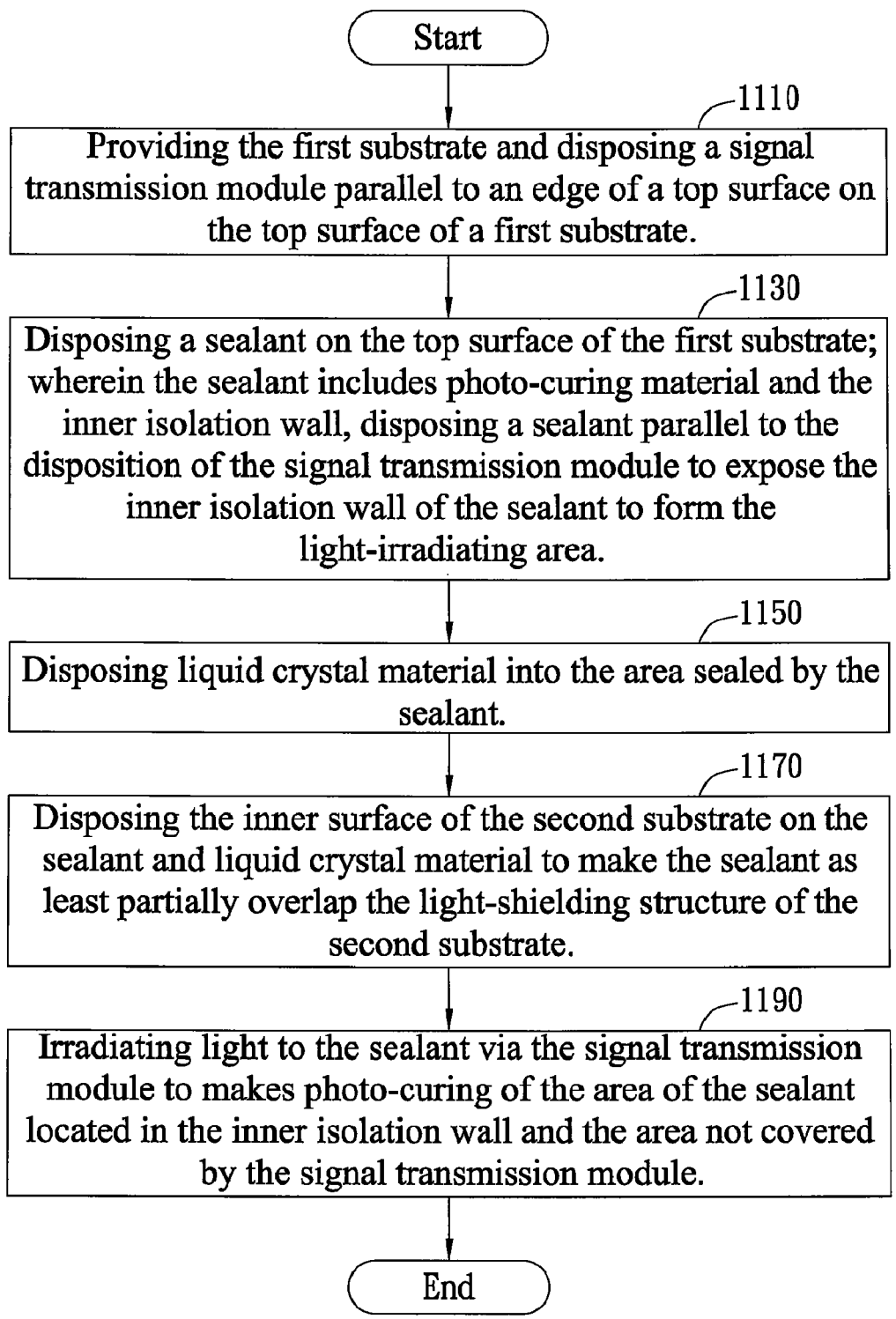
FIG. 11 shows a flow chart of a fifth embodiment.

In the fifth embodiment of manufacture method in the present invention shown in FIG. 11, the step 1110 includes providing the first substrate and disposing a signal transmission module parallel to an edge of a top surface on the top surface of a first substrate. The practical process for preparing the first substrate and signal transmission module has been described above. The step 1130 includes disposing a sealant on the top surface of the first substrate, wherein the sealant includes photo-curable material and has the inner isolation wall. The sealant is preferably disposed parallel to the disposition of the signal transmission module. In this step, signal transmission module is disposed to partially cover the sealant and to expose the inner isolation wall of the sealant to form the light-irradiating area.

The step 1150 includes disposing liquid crystal material into the area sealed by the sealant. The step 1170 includes disposing the inner surface of the second substrate on the sealant and liquid crystal material, wherein the light-shielding structure is disposed close to an edge of the second substrate and parallel to the edge so as to make the sealant as least partially overlap the light-shielding structure. The practical process for preparing relationship among light-shielding structure, second substrate and the sealant has been described above.

The step 1190 includes irradiating light to the sealant via the signal transmission module and first substrate. By doing so, it is useful to make the area of the sealant locate in the inner isolation wall and the area exposed via the signal transmission module to be curing. The light used in step 1190 is required to suitable for the material of the sealant such as acryl resin. When it irradiates the visible light, the photo-curable material is preferably selected from visible photo-curable material. Because the signal transmission module partially covers the sealant, light is able to pass through the signal transmission module to irradiate on a part of the sealant. Besides, even the part of sealant covered by the signal transmission module is still possible to be curing because of the irradiation of the different angles of light emitted through the transparent gaps from the transparent gaps.

Figure 12:
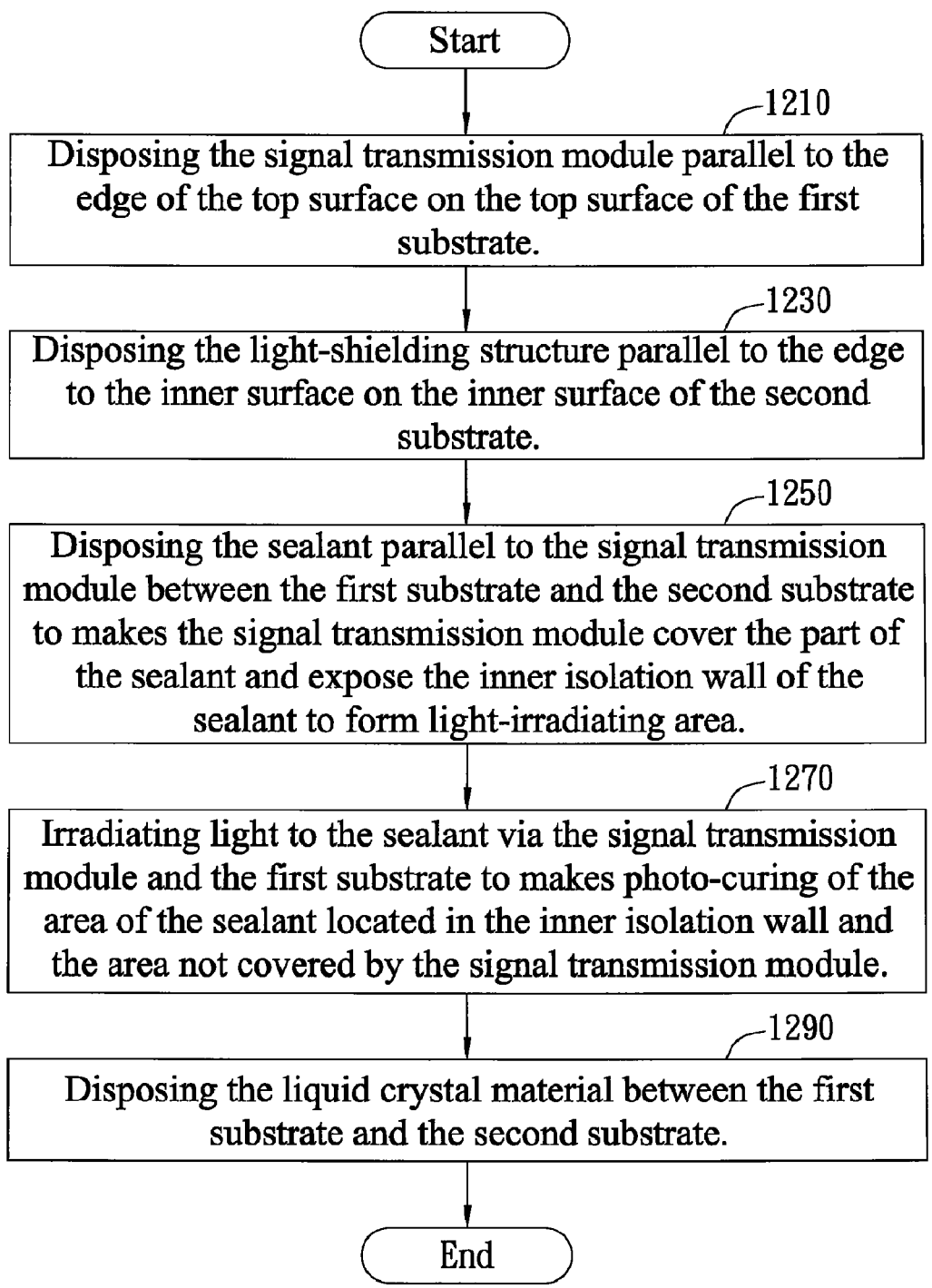
FIG. 12 illustrates a flow chart of a sixth embodiment.

In the sixth embodiment of manufacture method in the present invention shown in FIG. 12, the step 1210 includes disposing the signal transmission module parallel to the edge of the top surface on the top surface of the first substrate. The step 1230 includes disposing the light-shielding structure substantially parallel to the edge on the inner surface of the second substrate. These methods are similar with the methods of the fifth embodiment.

The step 1250 includes disposing the sealant parallel to the signal transmission module between the first substrate and the second substrate, wherein this step allows the sealant at least partially overlap the light-shielding structure. The sealant includes photo-curable material and inner isolation wall. The step makes the signal transmission module cover the part of the sealant and exposes the inner isolation wall of the sealant to form light-irradiating area. The step 1270 includes irradiating light to the sealant via the signal transmission module and the first substrate. By doing so, it is useful to make the area of the sealant located in the inner isolation wall and the area, which is not covered by the signal transmission module, to be curing. The method 1290 includes disposing the liquid crystal material between the first substrate and the second substrate.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display panel, comprising:
   a first substrate having a top surface and a signal transmission module disposed on the top surface and substantially parallel to an edge of the top surface;
   a sealant being made of a photo-curable material and including an inner isolation wall, wherein the sealant is disposed on the top surface of the first substrate and substantially parallel to the signal transmission module, the signal transmission module partially covers the partial area of the sealant and exposes the inner isolation wall of the sealant to form a light-irradiating area; and
   a second substrate having a inner surface and disposed on the sealant, such that the sealant being disposed between the first substrate and the second substrate, wherein a light-shielding structure, is disposed on the inner surface, and a place where the light-shielding structure is close and parallel to an edge of the inner surface, and the sealant at least partially overlaps the light-shielding structure.

2. The display panel of claim 1, wherein the signal transmission module includes a shading area and a plurality of transparent gaps formed in the shading area.

3. The display panel of claim 2, wherein the shading area includes a plurality of conductive lines parallel to each other, each of the plurality of transparent gaps is substantially parallel formed between two adjacent conductive lines.

4. The display panel of claim 3, wherein a plurality of the conductive lines includes a first group of the conductive lines and a second group of the conductive lines, the first group of the conductive lines has a first distance relative to the sealant in the vertical direction while the second group of the conductive lines has a second distance relative to the sealant in the vertical direction, the first distance is substantially greater than the second distance.

5. The display panel of claim 4, wherein the first substrate includes a first circuit layer and a second circuit layer, the first circuit layer and the second circuit layer are overlapped and disposed on the top surface, such that the first group of the conductive lines is formed in the first circuit layer while the second group of the conductive lines is formed in the second circuit layer.

6. The display panel of claim 2, wherein the shading area includes a plurality of conductive lines, the conductive lines cross with each other and so as to form a grid-like conductive pad, a plurality of holes formed in the grid-like conductive pad, and the holes as the transparent gaps.

7. The display panel of claim 2, wherein the shading area includes a slice-shaped conductive pad, a plurality of holes is formed in the slice-shaped conductive pad, and the holes as the transparent gaps.

8. The display panel of claim 2, wherein a ratio of the width of the shading area to the width of the transparent gaps decreases according to an increase of the width of shading area in the same direction.

9. The display panel of claim 8, wherein a ratio of the width of the shading area to the width of the transparent gaps increases according to an increase of the photo-curability of the sealant in the same direction.

10. The display panel of claim 1, wherein the part of the sealant exposed via the signal transmission module overlaps the light-shielding structure.

11. The display panel of claim 1, wherein the signal transmission module includes a dense-shading area corresponding to an outer part of the inner isolation wall of the sealant.

12. The display panel of claim 11, wherein the sealant has an outer isolation wall substantially parallel to the inner isolation wall, the dense-shading area is corresponding to a portion of the sealant disposed between the inner isolation wall and the outer isolation wall.

13. The display panel of claim 11, wherein the dense-shading area includes a circuit component.

14. The display panel of claim 13, wherein the circuit component includes a shift register.

15. A method for manufacturing a display panel, the method comprising:
providing a first substrate and disposing a signal transmission module substantially parallel to an edge of a top surface on the top surface of the first substrate;
providing a second substrate and disposing a light-shielding structure substantially parallel to an edge of an inner surface on the inner surface of the second substrate;
disposing a sealant between the first substrate and the second substrate and substantially parallel to the signal transmission module to allows the sealant at least partially overlap the light-shielding structure and to allow the signal transmission module partially cover the partial area of the sealant; wherein the sealant is made of a photo-curable material and includes an inner isolation wall, the inner isolation wall of the sealant is exposed via the signal transmission module to form a light-irradiating area; and
irradiating a light to the sealant via the signal transmission module and making the inner isolation wall of the sealant and area without covering by signal transmission module be curing.

16. The method of claim 15, wherein the signal transmission module disposing step includes forming a shading area and forming a plurality of transparent gaps in the shading area.

17. The method of claim 16, wherein the signal transmission module disposing step includes disposing the conductive lines and substantially parallel to each other to form the shading area, each of the transparent gaps is formed between the two adjacent conductive lines.

18. The method of claim 17, wherein the conductive lines forming step includes forming a partial of the conductive lines in the first circuit layer of the first substrate and forming other partial of the conductive lines in the second circuit layer of the first substrate.

19. The method of claim 16, wherein the signal transmission module disposing step includes disposing the conductive lines cross with each other to form a grid-like conductive pad, a plurality of holes are formed in the grid-like conductive pad, and the holes as the transparent gaps.

20. The method of claim 16, wherein the signal transmission module disposing step includes disposing a slice-shaped conductive pad to form a shading area, a plurality of holes is formed in the slice-shaped conductive pad, and the holes as the transparent gaps.

21. The method of claim 16, wherein the signal transmission module disposing step includes decreasing a ratio of the width of the shading area to the width of the transparent gaps according to an increase of the width of shading area in the same direction.

22. The method of claim 21, wherein the signal transmission module disposing step includes increasing a ratio of the width of the shading area to the width of the transparent gaps according to an increase of the photo-curability of the sealant in the same direction.

23. The method of claim 15, wherein the sealant disposing step includes exposing the part of the sealant via the signal transmission module overlapping with the light-shielding structure.

24. The method of claim 15, wherein the signal transmission module disposing step includes disposing a dense-shading area in the signal transmission module corresponding to an outer part of the inner isolation wall of the sealant.

25. The method of claim 24, wherein the dense-shading area forming step includes having an outer isolation wall of the sealant parallel to the inner isolation wall, the dense-shading area is corresponding to a portion of the sealant between the inner isolation wall and the outer isolation wall.

26. The method of claim 15, further comprising disposing a liquid crystal material into the area sealed by the sealant.

* * * * *